United States Patent
Carre

(10) Patent No.: US 8,469,527 B2
(45) Date of Patent: Jun. 25, 2013

(54) BIMORPH OPTICAL ELEMENT

(75) Inventor: Jean-François Carre, Pertuis (FR)

(73) Assignee: Societe Europeenne de Systemes Optiques, Aix En Provence (FR)

( * ) Notice: Subject to any disclaimer, the term of this patent is extended or adjusted under 35 U.S.C. 154(b) by 110 days.

(21) Appl. No.: 13/175,439

(22) Filed: Jul. 1, 2011

(65) Prior Publication Data

US 2013/0003202 A1   Jan. 3, 2013

(51) Int. Cl.
*G02B 5/08* (2006.01)

(52) U.S. Cl.
USPC .......................................................... 359/849

(58) Field of Classification Search
USPC .................... 359/223.1–226.1, 838, 846, 849
See application file for complete search history.

(56) References Cited

U.S. PATENT DOCUMENTS

| | | | |
|---|---|---|---|
| 7,508,117 B2* | 3/2009 | Takeuchi | 310/328 |
| 2010/0073789 A1* | 3/2010 | Border | 359/849 |

FOREIGN PATENT DOCUMENTS

| | | |
|---|---|---|
| EP | 1 723 461 A1 | 11/2006 |
| EP | 1 835 302 A2 | 9/2007 |
| FR | 2 866 122 A1 | 8/2005 |
| WO | WO 2005/085931 A1 | 9/2005 |

OTHER PUBLICATIONS

Search Report for French Application No. 1 000 471, dated Aug. 24, 2010.

* cited by examiner

*Primary Examiner* — Euncha Cherry
(74) *Attorney, Agent, or Firm* — Alston & Bird LLP

(57) ABSTRACT

The invention relates to a bimorph optical device comprising a deformable optical element and active elements made of piezoelectric ceramic provided with electrodes, said elements being controlled in pairs and in opposition so as to produce a compression movement for a first element of a pair and an extension movement for the second element of a pair, the device being characterized in that the optical element (1) presents an optically active first main surface (6) and a second main surface (7) opposite to the first main surface, together with at least first and second opposite lateral faces (2, 3), and in that the ceramic active elements comprise at least two pairs of bars (21, 22; 31, 32) of piezoelectric ceramic placed facing each other on said first and second lateral faces (2, 3), each pair comprising two bars (21, 22; 31, 32) placed on one of the first and second lateral faces (2, 3) on either side of a middle surface of the optical element (1) that constitutes the neutral axis thereof.

14 Claims, 3 Drawing Sheets

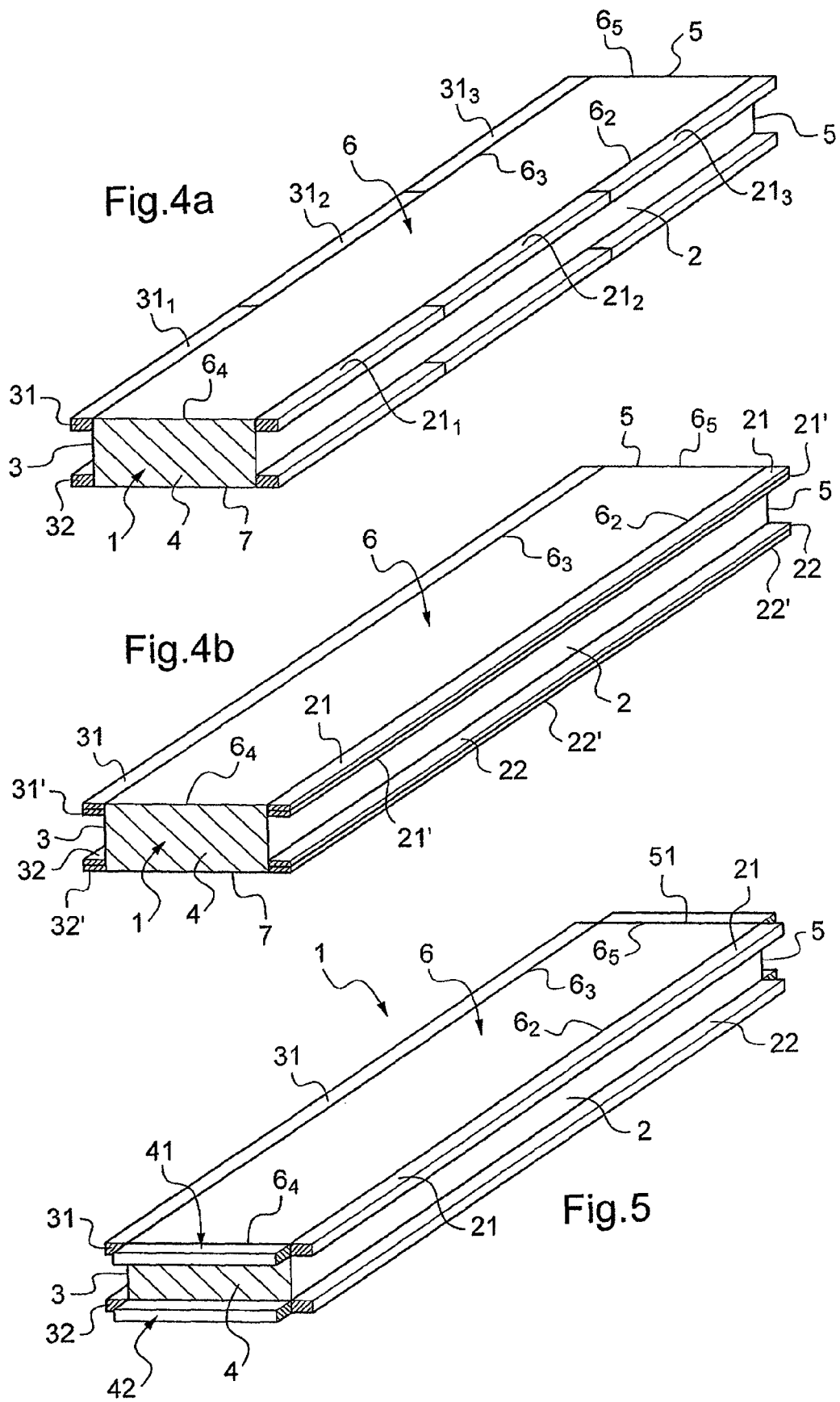

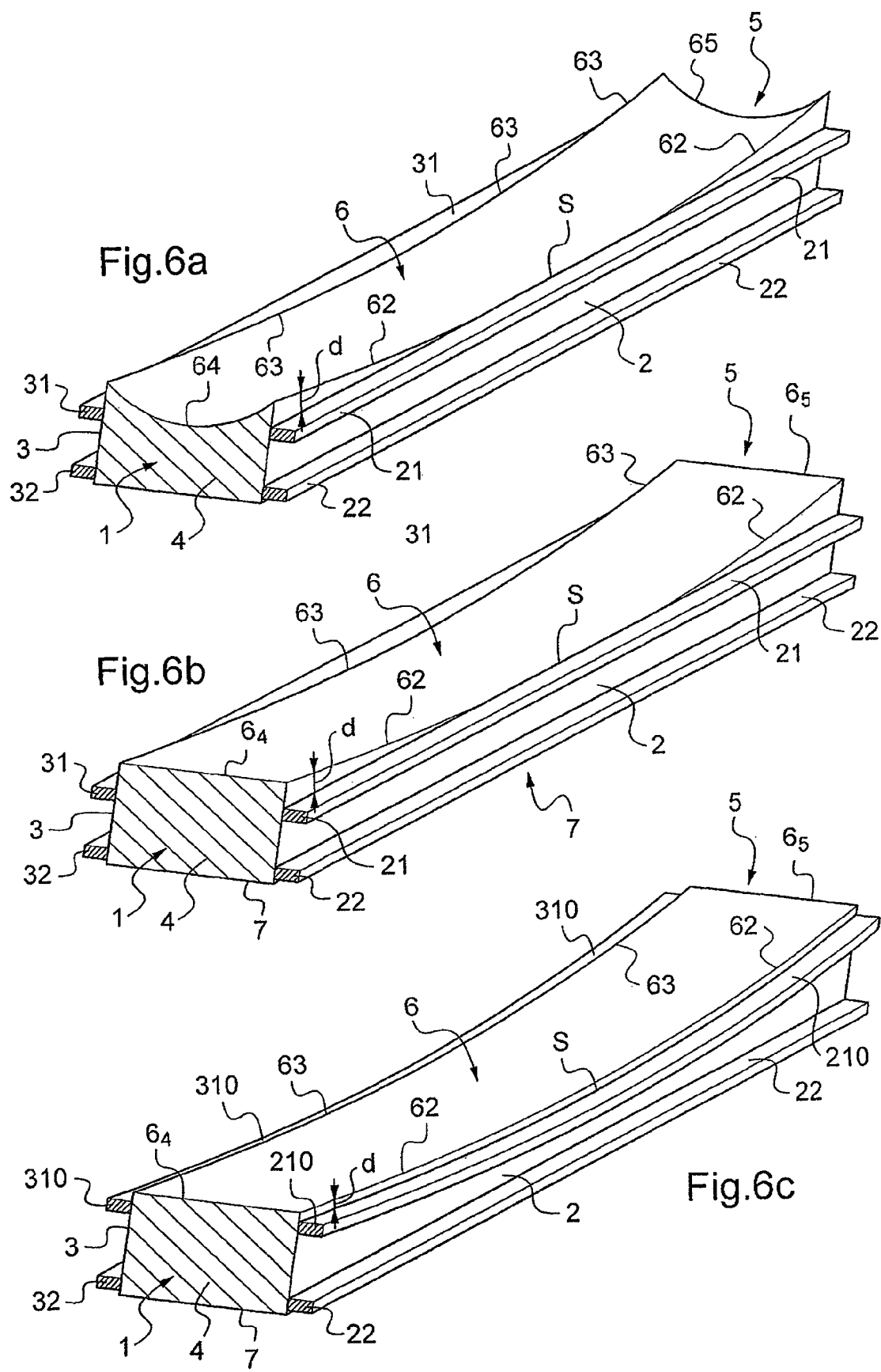

BIMORPH OPTICAL ELEMENT

FIELD OF THE INVENTION

The present invention provides a bimorph optical element controlled by active elements made of piezoelectric ceramic that are actuated in opposition.

BACKGROUND

European patent application EP 1 723 461 relates to a bimorph mirror presenting two ceramic layers having electrodes and spaced apart by a central core.

Such a mirror is assembled in the form of a laminated structure having two so-called "skin" layers, at least one of which is used as a mirror, with the two ceramic layers and the central core being sandwiched between the two skin layers.

Implementing a laminated structure is relatively complicated and difficult.

The laminated structure concept used for bimorph mirrors also limits the dimensions of such mirrors to the dimensions of ceramic elements and to multiples thereof, and the quality with which the mirror is polished is limited by the presence of the laminated structure.

Solutions known in the prior art have always been based on assembling ceramic elements on a face that is parallel to the working optical face.

Under all circumstances, the ceramics are adhesively bonded to a face that is parallel to the optical face, thereby leading to a structure that is laminated in the direction perpendicular to the optical face.

That also applies to document EP 1 835 302 in which the ceramics are adhesively bonded to the face that is opposite from the optical face.

When the ceramic bars are bimorphs, i.e. when the bars comprise two pieces of ceramic stuck back to back, stability is limited by a bimetal type effect when the temperature of the assembly changes.

Furthermore, if the deformable mirror is of dimensions greater than the dimensions of the ceramic elements (which happens very often because of the limited dimensions of commercially-available ceramics), the manufacturer needs to place a plurality of pieces of ceramic end-to-end in order to obtain the necessary dimensions, and in document EP 1 835 302, those junctions between pieces of ceramic are located on the non-optical rear face of the mirror and that discontinuity becomes manifest when the ceramics are put under stress in order to change the curvature of the mirror.

SUMMARY

The present invention seeks to avoid at least one of the above-mentioned drawbacks, at least in part, by adopting a structure in which the piezoelectric elements are located laterally relative to an optical element that no longer presents such a laminated structure, where such a structure used to incorporate the piezoelectric elements.

The invention thus provides a bimorph optical device comprising a deformable optical element and active elements made of piezoelectric ceramic provided with electrodes, said elements being controlled in pairs and in opposition so as to produce a compression movement for a first element of a pair and an extension movement for the second element of a pair, the device being characterized in that the optical element presents an optically active first main surface and a second main surface opposite to the first main surface, together with at least first and second opposite lateral faces, and in that the ceramic active elements comprise at least two pairs of bars of piezoelectric ceramic placed facing each other on said first and second lateral faces, each pair comprising two bars placed on one of the first and second lateral faces on either side of a middle surface of the optical element that constitutes the neutral axis thereof.

In the device of the invention, the above-specified principle is necessarily bimorph since it is constituted by pairs of opposite ceramics placed on either side of the neutral axis of the deformable optical element, thus causing them to operate in opposition, one element being in compression and the other in extension, and vice versa.

Furthermore, the ceramics are not adhesively bonded to a face that is parallel to the optical face or between faces that are parallel to the optical face, but rather laterally on the sides. The structure is therefore no longer laminated.

Unlike prior art devices, such as the device described in document EP 1 835 302, the curvature of the ceramic is no longer used directly to curve the mirror.

The ceramic bars are adhesively bonded to the lateral faces of the optical element via their own lateral faces. In the prior art, the bonded face does not remain plane, but rather follows the curvature that in turn causes the mirror to be curved.

In the invention, the lateral faces of the bars remain plane, and the action on the ceramic bars gives rise to a change in their length. It is the reaction of the bar that is changed in length that gives rise to the curvature. The curvature generated by the action of the bars on the lateral faces of the mirror is distributed uniformly relative to the center of the mirror, unlike that which might have been expected.

The present invention thus stems from a functional analysis that is original.

This arrangement also presents several advantages.

The most important is that the ceramic elements are placed on outside faces, and thus on either side of and as far as possible from the neutral axis as compared with the laminated structure described in application EP 1 723 461, thus enabling action to be maximized on the mirror.

Because of the improved coupling between the ceramic and the mirror, that action gives rise to better accuracy and better stability of the mirror when it is curved.

Since the ceramics are no longer under or on the optical surface, junctions between the ceramic elements are less visible and the effect of such junctions is smoothed over the width of the mirror.

Unlike the description of application EP 1 835 302, the structure of the present invention is symmetrical about the neutral axis of the optical element, thereby avoiding any bimetal-type thermal effect (even if industrial bars may be made up of a plurality of ceramic elements that are adhesively bonded together), thereby giving very good thermal stability.

These advantages are of particular interest when a traditional mirror is being transformed into a bimorph mirror, since the solution of applying ceramics (monomorphs or bimorphs) to the rear face is a poor adaptation, giving rise to a smaller dynamic range and suffering from a bimetal-type thermal effect.

At least one control bar may have a face that is coplanar with a said main surface.

The device may be characterized in that at least one of the main surfaces intersects the first and second lateral faces along a straight line segment, and in that at least some of said ceramic bars are straight and placed parallel to said straight line segments.

The device may be characterized in that at least one of the main surfaces intersects the first and second lateral faces along curve segments that are concave or convex, and in that at least some of said ceramic bars are straight and are placed parallel to the mean directions of said curve segments.

The device may be characterized in that at least one of the main surfaces intersects the first and second lateral faces along a curve segment that is concave or convex, and in that at least some of said ceramic bars are curved and are disposed in such a manner as to follow said curve segments.

At least one ceramic bar may comprise at least two piezoelectric ceramic elements that are placed end-to-end and/or that are superposed.

Advantageously, the optical element is a rectangular parallelepiped, preferably square or rectangular in shape, and the first and second lateral faces extend along its long sides when the element is rectangular.

The ratio of the length L to the width l of the rectangular parallelepiped advantageously lies in the range 1 to 100, more particularly in the range 3 to 50, and preferably in the range 3 to 25.

The width l may for example lie in the range 10 millimeters (mm) to 80 mm.

The length L may for example lie in the range 40 mm to 1500 mm.

The thickness e of the optical element may for example lie in the range 5 mm to 100 mm.

The optical device may also include at least two of said pairs of bars of piezoelectric ceramic placed in the same manner on third and fourth opposite lateral faces.

Because the device of the invention implements piezoelectric actuators in opposition that are merely bonded to two or four lateral faces, it can be implemented with any optical device that is deformable.

By way of example, the optical element may be a mirror body, with at least the first main surface being polished.

By way of example, the optical element may be a grating with at least the first main surface presenting at least one grating pattern.

BRIEF DESCRIPTION

Other characteristics and advantages of the invention appear better on reading the following description with reference to the drawings, in which:

FIGS. 4a and 4b show two variant implementations of the electrode pairs;

FIG. 5 shows the electrode pairs implemented on four side faces; and

FIGS. 6a to 6c show variant implementations with at least one main face that is curved.

DETAILED DESCRIPTION

Figure 1:
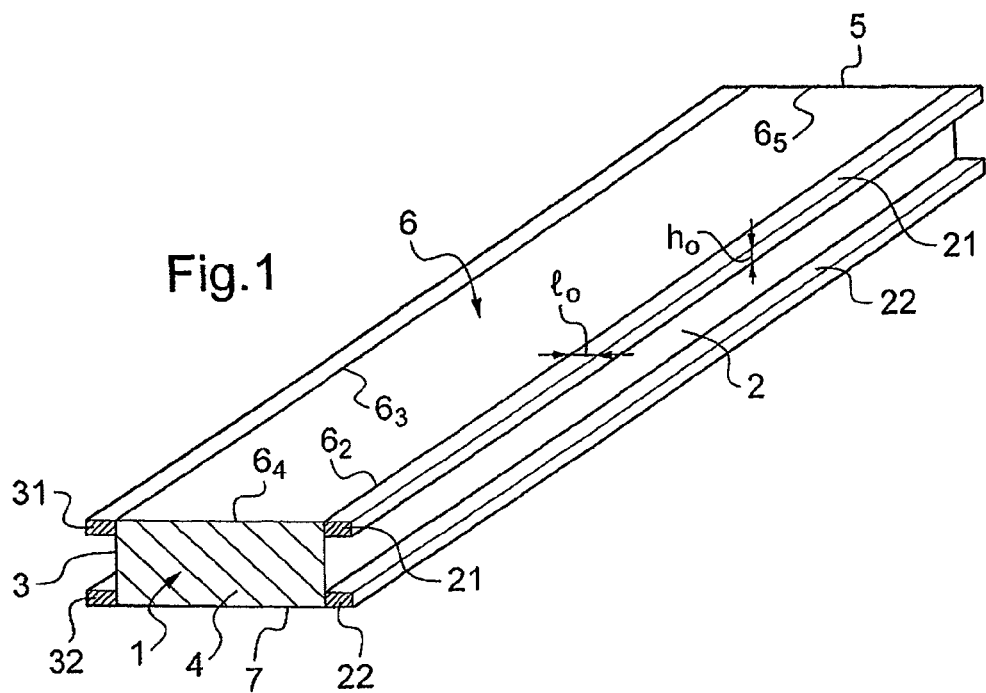
FIG. 1 is a perspective view of a device of the invention, e.g. a mirror.

FIG. 1 shows a deformable optical element 1 of rectangular shape that presents two main lateral faces 2 and 3 along the long side of the rectangle and two end lateral faces 4 and 5. The top face 6 presents an optical function, for example it is polished so as to form a mirror that is plane or curved (concave or convex) in the longitudinal direction and/or in the transverse direction, or else it carries one or more grating patterns with lines that are perpendicular to the long sides of the rectangle or parallel thereto, for example, so as to form a grating that is plane or curved (concave or convex) in the longitudinal direction and/or in the transverse direction and that operates in reflection or in diffraction.

The lateral face 2 carries a first pair of piezoelectric bars 21, 22 that are substantially parallel to the midplane P (drawn in chain-dotted lines in FIG. 2) of the optical element 1 and defining the neutral axis (when the planes 6 and 7 are plane or curved only slightly), and that are preferably symmetrically spaced apart. The same applies for the bars 31 and 32 secured to the lateral face 3. When at least one face is curved, the neutral axis is a middle surface that is not plane.

The surface 6 may be plane, cylindrical, toroidal, spherical, or aspherical (e.g. elliptical, parabolic, or hyperbolic), and thus with radii of curvature that are constant or not constant. In the example shown, the face 6 is plane and defined by straight line segments $6_2$, $6_3$, $6_4$, and $6_5$.

The bottom face 7 may optionally present optical functions, and like the top face 6 it may be plane or it may be curved (concave or convex).

The radii of curvature of the face 6 (and/or 7) lies for example in the range 10 mm to ∞ (plane surface) in a direction that does not carry piezoelectric bars (here transverse faces 4 and 5), and in the range 100 mm to ∞ in the direction carrying piezoelectric bars (here longitudinal faces 2 and 3).

Such curvature(s) may also be implemented for an optical element 1 that is square in shape.

This curvature is oriented in the same direction as the curvature produced by the pairs of piezoelectric elements 21, 22, 31, 32, or it is perpendicular thereto.

Each bar 21, 22, 31, 32 is constituted by a piece of piezoelectric ceramic or a plurality of pieces placed end-to-end.

These piezoelectric bars 21, 22, 31, 32 are preferably level with the faces 6 and 7, thus serving to space them as far as possible from the neutral axis and thus obtain maximum curvature for the optical element 1 for a given control signal applied to the bars, while minimizing the stresses in the adhesive bonding of the bars.

Figure 2:
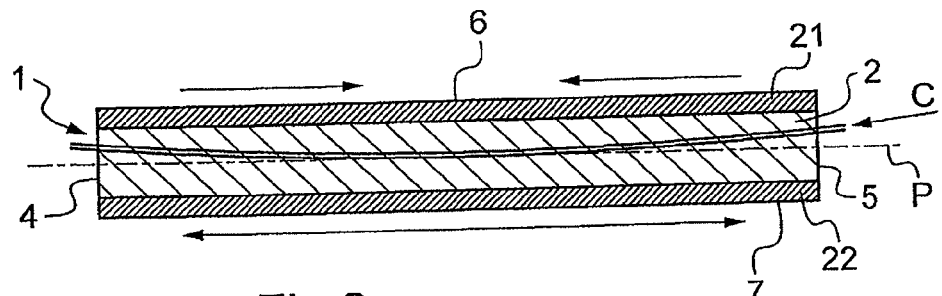
FIG. 2 is a side view of FIG. 1.

The bars 21 and 22 are in opposition, and for example the same control signal applied to their electrodes (not shown) causes the bar 21 to be compressed and the bar 22 to be extended, as shown in FIG. 2, or vice versa. FIG. 2 is a diagram that shows (in exaggerated manner) the curvature of the optical element 1 for modifying the curvature of its optically active face 6 so as to give it a profile C that is concave, starting from a plane face.

If starting from a face 6 that is concave or convex, it is possible to offset the range over which curvature can be varied without modifying the amplitude of the variation.

The bars 21, 22, 31, 32 are adhesively bonded to the lateral faces 2 and 3. They preferably extend over the entire length of these faces. With a mirror, adhesive bonding may be performed after the face 6 has been polished, thereby facilitating fabrication, particularly since the part 1 is a single piece.

This feature enables a pre-existing passive mirror to be transformed into an active mirror, which is not possible with laminated structures.

For other optical elements, in particular gratings, the piezoelectric bars 21, 22, 31, 32 may be adhesively bonded after the face 6 has been finished, i.e. after optical characteristics have been imparted thereto.

Compared with mirrors of laminated structure, the ceramic pieces used are smaller since they do not cover the surface of the mirror, thereby reducing cost. Their dimensions may thus be adapted to the value desired for the curvature. For example, a bar may have a width $l_0$, lying in the range 2 mm to 30 mm and a height $h_0$ lying in the range 2 mm to 30 mm. Furthermore, since there is no electrode under a skin layer constituting the mirror, there is no longer any local deformation due to the junctions between electrodes.

The optical element 1 may be made of any material suitable for use in optics: for example glass, silica, silicon, silicon carbide, germanium, laser glass, ZnS and ZnSe, metals.

Figure 3:
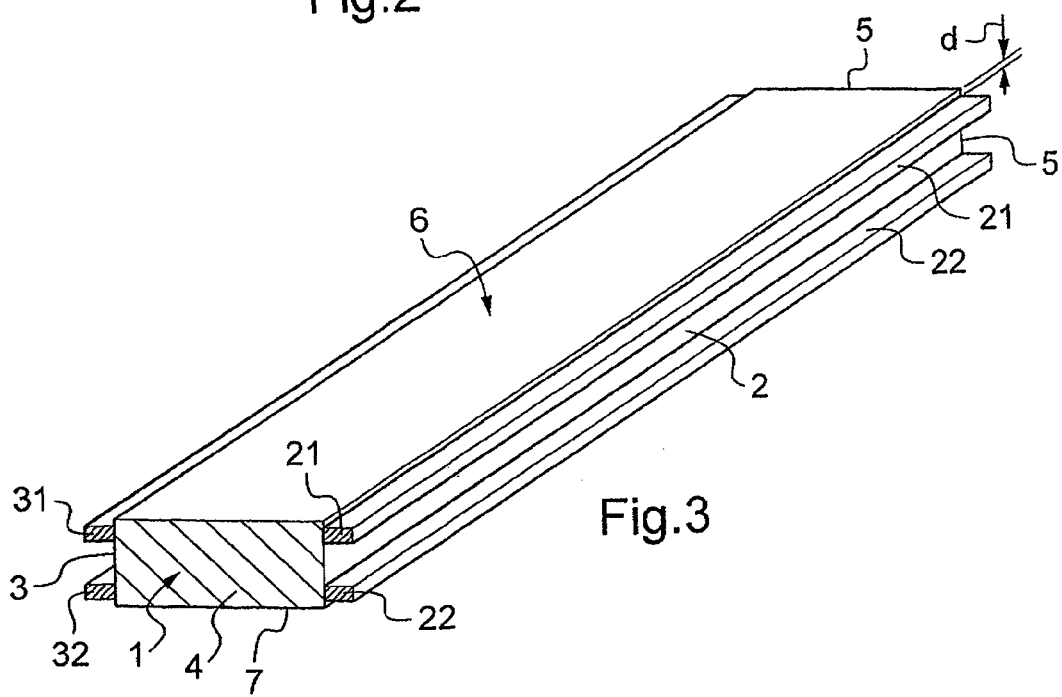
FIG. 3 shows a variant in which the bars are offset from the surface of the optical element.

FIG. 3 shows a variant in which the ceramic bars 21, 22, 31, 32 are spaced away from the surfaces 6 and 7, e.g. through a distance d that is less than 10 mm, and for example lies in the range 0.1 mm to 4 mm. This is appropriate in particular when the surfaces 6 are concave or convex.

FIGS. 4a and 4b show variant embodiments of the invention with individual bars $21_1$, $21_2$, $21_3$, $22_1$, $22_2$, $22_3$, $31_1$, $31_2$, $31_3$, etc. that are placed end-to-end (FIG. 4a) and/or superposed (FIG. 4b) (references 21, 21', 22, 22').

When a plurality of piezoelectric ceramic bars are adhesively bonded together end-to-end (for long mirrors), the junctions that are formed on the lateral faces 2 and 3 of the optical element 1 do not give rise to defects in planeness in the optically active surface 6. Such defects also cannot arise over time (FIG. 4a).

A bar 21, 22, 31, 32 may be formed by superposing two individual bars that are adhesively bonded together (FIG. 4b).

FIG. 5 shows a bimorph mirror that may be curved along two axes that are perpendicular by having additional piezoelectric bars 41, 42, 51, 52 adhesively bonded to the faces 4 and 5 of an optical element 1 that is square or rectangular, and preferably spaced symmetrically about the midplane P which constitutes the neutral axis when the surfaces 6 and 7 are plane or only slightly curved. These bars 41, 42, 51, 52 have faces that are preferably flush with the faces 6 and 7 or else are offset therefrom as shown in FIG. 3. The surface 6 and/or the surface 7 may be plane or curved in one or two directions of curvature produced by the pairs of piezoelectric elements, or perpendicularly to such a direction. The radii of curvature may lie in the range 100 mm to ∞.

This double actuation by two pairs of lateral piezoelectric actuators is suitable for use in particular with optical parts that are square or rectangular in shape. The ratio L/l may lie in the range 1 (square) to 5.

FIG. 6a shows a mirror with its polished top plane surface 6 that is concave both in the longitudinal direction and in the transverse direction. The bars 21, 22, 31, 32 are straight and disposed longitudinally.

They are parallel to each other and directed in the mean direction of the curve segment 62 or 63 that represents the intersection between the top surface 6 and the lateral face 2 or 3. The curve segments 64 and 65 correspond to the intersection between the top face 6 and the lateral faces 4 and 5, respectively. In the example shown, this direction is parallel to the bottom face 7, which is plane, however this face could also be convex or concave in the longitudinal and/or transverse direction(s). This direction is generally parallel to the tangent at the apex S, in particular for curve segments that are parabolic or hyperbolic in shape. This arrangement may equally well be implemented when the top face 6 is curved only in the longitudinal direction (FIG. 6b). The intersection between the top face 6 and the lateral faces 4 and 5 then takes place along straight line segments $6_4$ and $6_5$.

FIG. 6c shows a mirror having its polished top surface 6 that is concave in the longitudinal direction. The bars 210 and 310 adjacent to the surface 6 follow the curve segment 62 or 63 that represents the intersection between the top surface 6 and the lateral face 2 or 3. The bars 22 and 32 are straight and they extend along the longitudinal direction parallel to the bottom face 7. In the example shown, the bars 21 and 31 are spaced away from the top surface 6 by said distance d. They could equally well be flush with the curve segment.

The straight or curved bars are thus placed in such a manner as to follow very closely the straight line segments ($6_2$, $6_3$, $6_4$, $6_5$) or the curved segments (62, 63, 64, 65) at a distance d that is constant or otherwise, but that is less than or equal to 10 mm, in particular 4 mm.

The invention claimed is:

1. A bimorph optical device comprising a deformable optical element and active elements made of piezoelectric ceramic provided with electrodes, said elements being controlled in pairs and in opposition so as to produce a compression movement for a first element of a pair and an extension movement for the second element of a pair, the device being characterized in that the optical element presents an optically active first main surface and a second main surface opposite to the first main surface, together with at least first and second opposite lateral faces and in that the ceramic active elements comprise at least two pairs of bars of piezoelectric ceramic placed facing each other on said first and second lateral faces, each pair comprising two bars placed on one of the first and second lateral faces on either side of a middle surface of the optical element that constitutes the neutral axis thereof.

2. A bimorph optical device according to claim 1, wherein at least one of the main surfaces intersects the first and second lateral faces along a straight line segment, and in that at least some of said ceramic bars are straight and placed parallel to said straight line segments.

3. A bimorph optical device according to claim 1, wherein at least one of the main surfaces intersects the first and second lateral faces along curve segments that are concave or convex, and in that at least some of said ceramic bars are straight and are placed parallel to the mean directions of said curve segments.

4. A bimorph optical device according to claim 1, wherein at least one of the main surfaces intersects the first and second lateral faces along a curve segment that is concave or convex, and in that at least some of said ceramic bars are curved and are disposed in such a manner as to follow said curve segments.

5. A bimorph optical device according to claim 1, wherein at least one ceramic bar comprises at least two piezoelectric ceramic elements that are placed end-to-end or are superposed.

6. A bimorph optical device according to claim 1, wherein the optical element is in the form of a rectangular parallelepiped and in that said first and second lateral faces extend along the long sides of the rectangle.

7. A bimorph optical device according to claim 6, wherein the ratio of the length L to the width l of said rectangular parallelepiped lies in the range 1 to 100.

8. A bimorph optical device according to claim 7, wherein the width l lies in the range 10 mm to 80 mm.

9. A bimorph optical device according to claim 7, wherein the length L lies in the range 40 mm to 1500 mm.

10. A bimorph optical device according to claim 1, wherein the width $l_0$ of said two bar lies in the range 2 mm to 30 mm, and a height $h_0$ of said two bars lies in the range 2 mm to 30 mm.

11. A bimorph optical device according to claim 6, further comprising third and fourth opposite lateral faces including at least two of said pairs of piezoelectric ceramic bars.

12. A bimorph optical device according to claim 1, wherein the thickness e of the optical element lies in the range 5 mm to 100 mm.

13. A bimorph optical device according to claim 1, wherein the optical element is a mirror body and in that at least the first main surface is polished.

14. A bimorph optical device according to claim 1, wherein the optical element is a grid, and in that at least the first main surface carries at least one grid pattern.

* * * * *